Patented Oct. 14, 1941

2,259,085

UNITED STATES PATENT OFFICE 2,259,085

UREA-PHENOLIC BAKING LACQUER AND PROCESS OF MAKING SAME

John B. Rust, Verona, N. J., assignor to Ellis-Foster Company, a corporation of New Jersey No Drawing. Application August 29, 1940,
Serial No. 354,666

4 Claims. (Cl. 260—45)

The present invention relates to urea-phenolic baking lacquers and the process of making same. An object of the invention is to produce rapid curing baking lacquers which have excellent color retention, hardness, gloss and chemical resistance. It is a further object to produce clear lacquers using a minimum amount of formaldehyde by the coreaction of a phenol, urea and biuret. It is also an object to produce lacquers from coreaction products of urea, biuret, formaldehyde and higher substituted phenols which possess outstanding resistance to weathering, water, alkalies and acids. Other objects of this invention will hereinafter become apparent.

It is known that urea-formaldehyde-alcohol resins, either alone or in combination with alkyd resins, may be converted on application of heat to very hard, insoluble, infusible films which do not substantially darken or change color and, hence, may be advantageously employed as constituents of white or pastel baking enamels. On the other hand, phenolic baking lacquers are known to yield hard, resistant films which discolor badly.

It has now been found that by simultaneously condensing urea, biuret, a phenol and formaldehyde, according to the procedure hereinafter described, lacquer compositions are secured which, on baking, exhibit no discoloration and possess outstanding resistance to boiling water, hot soap solutions, organic solvents, 5% sodium hydroxide and the like.

All proportions of urea, biuret, a phenol and formaldehyde do not produce clear lacquer solutions, but only those in which the correct proportion of reactants has been used. For instance, the amount of formaldehyde which is necessary to produce clear lacquer solutions is very critical when the proportion is at or near the clear-cloudy transition boundary. Furthermore, if one employs a C. P. grade of urea with no phenol or biuret a very large proportion of formaldehyde is required to produce clear lacquer solutions when the formaldehyde is not neutralized. This amount is about seven moles of formaldehyde to one mole of urea when commercial 37½% formaldehyde solutions are employed. The addition of a phenol to the reaction mixture greatly reduces the amount of formaldehyde needed to form clear lacquers and the inclusion of biuret still further reduces the formaldehyde requirement.

It is very desirable economically to reduce the formaldehyde to a minimum since on a dry weight basis it is the most costly ingredient of the compositions of the present invention. Furthermore, excess quantities of formaldehyde tend to form hydrophilic groups which decrease the resistance and wearing qualities of the lacquers of the present invention. The proportion of biuret employed has a relatively great effect on the formaldehyde requirements since as little as 2.5% biuret (based on the urea) reduces the formaldehyde necessary to form clear lacquers with urea alone from 7 moles to 2 moles.

The compositions of the present invention therefore are four-component resins consisting of urea, biuret, a phenol and formaldehyde. It has been found that within a restricted region which includes the practical and important lacquer solutions, the boundary which separates clear from cloudy lacquer solutions may be represented geometrically by a plane. This boundary plane therefore represents the minimum amount of formaldehyde for a given proportion of urea, biuret and a phenol which under the procedure of the present invention will produce clear lacquer solutions. In general this boundary plane will be different for different phenols but it has been found that the plane representing the clear-cloudy transition boundary for amyl phenol, urea, biuret, and formaldehyde can be taken as an average and thus may be made to represent the general boundary condition for the resins of the present invention. The equation which expresses this approximate boundary relationship with an error of only about 2% or 3% is:

$$F = \left(9.3 - \frac{254B}{U+B}\right)(U+B+P) - 11.2P$$

where P is the weight of phenol, U the weight of urea, B the weight of biuret and F the weight of 37½% formaldehyde solution.

Therefore, for a mixture of a phenol, urea, and biuret the above formula can be used to calculate the minimum practical amount of formaldehyde which gives a clear resinous composition or lacquer having the unusual properties described above. To form a lacquer there is used a mixture of urea, biuret, a phenol and formaldehyde, the proportions of reactants being restricted. It is obvious from an inspection of the formula that relatively large amounts of biuret with respect to urea and phenol would give a negative amount of formaldehyde and similarly large amounts of a phenol with respect to the other constituents would give such small amounts of formaldehyde as to be non-resin-forming. Such extreme cases, of course, would not yield resins having the desired properties as above described. However, it has been found that satisfactory lacquer solutions may be prepared if the proportions of the reactants are determined as follows: The amount of biuret may vary from 0.1 to 2.5% of the weight of urea as the urea varies from 1 to 10 times the weight of phenol. From these conditions then the minimum weight of 37.5% aqueous formaldehyde is calculated from the above formula. If the aqueous formaldehyde is of a concentration other than 37.5%, the amount is adjusted to the basis of 37.5%.

As stated above, the formula given may be used to calculate the minimum practical weight of 37.5% aqueous formaldehyde. However, substantially more formaldehyde may be employed than this minimum to produce clear lacquers without materially detracting from the excellent properties of the present compositions. Besides phenol and amylphenol which have been mentioned, there may be employed in the resins of the present invention cresol, xylenol, butylphenol, phenylphenol and the like.

The following examples will serve to illustrate the process and products of the present invention. All proportions are in parts by weight unless otherwise specified.

*Example 1.*—(Calculated minimum formaldehyde=209 parts.) 20 parts of U. S. P. phenol, 0.33 part of recrystallized biuret, 39.67 parts of C. P. urea, and 209 parts of 37½% formaldehyde solution were mixed and heated to boiling under a reflux condenser for 30 minutes. 0.6 part of oxalic acid was added in solution and refluxing allowed to continue for 30 minutes. 150 parts of n-butanol were added and the solution dehydrated under reduced pressure until a clear, medium viscous lacquer containing over 50% solids was secured. The lacquer when applied to a surface and cured in an oven at 100° C. for one hour, formed a very hard, colorless, highly resistant film. The lacquer was readily compatible with medium- and short-oil drying and non-drying oil alkyd resins.

The solution of the above example contained sufficient formaldehyde to produce a clear solution. In the following example the proportion of formaldehyde was reduced to such an extent that a cloudy lacquer was formed. When the proportion of reactants is such that cloudy solutions are produced the clouding is generally observed during the first 10 minutes or so of refluxing and before an acid catalyst is added to complete the reaction.

*Example 2.*—(Calculated minimum formaldehyde=209 parts.) 20 parts of U. S. P. phenol, 0.33 part of recrystallized biuret, 39.67 parts of C. P. urea, and 190 parts of 37½% formaldehyde solution were mixed and heated to boiling under a reflux condenser. In a very few minutes the solution clouded.

The preferable procedure for the preparation of the products of this invention is to mix the reactants together and heat to boiling for a short period of time. It appears that the addition of an acid catalyst before the reaction mixture is heated tends to yield non-uniform products and cloudy solutions, occasionally even when the correct proportion of reactants is employed. If, however, the acid catalyst is added after an initial conditioning reaction the entire reaction is more easily controlled and readily reproducible results are secured.

It has been proposed to react separately-formed urea-formaldehyde and phenol-formaldehyde resins. There have also been proposals for the addition first of an alkaline catalyst, then an acid catalyst to mixtures of urea, phenol and formaldehyde. However, by employing the procedure of the present invention wherein a solution of urea, a phenol and formaldehyde is subjected to an initial conditioning reaction, then an acid catalyst is added to complete the reaction, resins and lacquers are easily produced which contain no insoluble inorganic salts and which have excellent color retention, stability, and chemical resistance.

*Example 3.*—(Calculated minimum formaldehyde=368 parts.) 10 parts of U. S. P. phenol, 0.47 part of recrystallized biuret, 56.23 parts of C. P. urea and 340 parts of 37½% aqueous formaldehyde solution were mixed and heated to boiling under a reflux condenser. After several minutes the solution clouded badly.

*Example 4.*—(Calculated minimum formaldehyde=368 parts.) 10 parts of U. S. P. phenol, 0.47 part of recrystallized biuret, 56.23 parts of C. P. urea and 368 parts of 37½% aqueous formaldehyde solution were mixed and heated to boiling under a reflux condenser for 30 minutes. 0.67 part of oxalic acid was added and refluxing continued for 30 minutes. 150 parts of n-butanol were added and the solution dehydrated under reduced pressure to produce a clear, medium viscous lacquer solution containing over 50% solids.

It has been determined that in the case of phenol no solvent need be added before or during the reaction. It has also been found that an alcohol or any other type of solvent has no effect upon the clouding of lacquer solutions made according to the procedure of the present invention. In the case of substituted phenols, however, such as cresols, xylenols, amylphenol and the like a solvent of some kind which is miscible with the phenol and the aqueous solution employed is necessary in order that the resin as it is formed may be kept in solution. Such solvents as n-butanol, amyl alcohol, dioxan, diethyl ether of ethylene glycol, ethylene glycol monoethyl ether, ethyl lactate, or combinations of these solvents with others which have satisfactory properties may be employed.

*Example 5.*—(Calculated minimum formaldehyde=129 parts.) 17.6 parts of symmetrical xylenol, 0.29 part of recrystallized biuret, 29.71 parts of C. P. urea, 129 parts of 37½% aqueous formaldehyde and 100 parts of diethylene glycol monoethyl ether were mixed and heated to boiling under a reflux condenser for 30 minutes. 0.48 part of oxalic acid was added and refluxing continued for 60 minutes. The solution was dehydrated under reduced pressure to form a clear lacquer solution of around 50% solids.

*Example 6.*—(Calculated minimum formaldehyde=150 parts.) 32.6 parts of a practical grade of o-phenylphenol, 0.4 part of recrystallized biuret, 41.6 parts of C. P. urea, 160 parts of 37½% formaldehyde solution and 150 parts of n-butanol were mixed and heated to boiling under a reflux condenser for 30 minutes. 0.64 part of oxalic acid was added and refluxing continued for 90 minutes. The solution was dehydrated under reduced pressure to secure a clear, medium viscous lacquer solution of around 50% solids.

*Example 7.*—(Calculated minimum formaldehyde=157.5 parts.) 35 parts of metapara cresol (containing 70–75% m-cresol), 0.2 part of recrystallized biuret, 34.8 parts of C. P. urea, 157.5 parts of 37½% formaldehyde solution and 150 parts of n-butanol were mixed and heated to boiling under a reflux condenser for 30 minutes. 0.7 part of oxalic acid was added and refluxing continued for 90 minutes. The solution was dehydrated under reduced pressure to form a clear, medium viscous lacquer solution of around 50% solids.

Although oxalic acid was employed in the preceding examples as a catalyst, other acid catalysts such as maleic, phthalic, formic, phosphoric, chloroacetic acid and the like may also be employed.

*Example 8.*—(Calculated minimum formaldehyde=62 parts.) 8.8 parts of p-tertiary amylphenol, 0.15 part of recrystallized biuret, 14.85 parts of C. P. urea, 62 parts of 37½% aqueous formaldehyde and 60 parts of ethylene glycol monoethyl ether were mixed and heated to boiling under a reflux condenser for 30 minutes. 0.5 part of 85% o-phosphoric acid was added and refluxing continued for 90 minutes. The solution was dehydrated under reduced pressure to produce a clear, medium viscous lacquer solution of around 50% solids.

When urea is carefully heated ammonia is evolved and biuret is formed. In the foregoing examples a pure recrystallized biuret was employed. However, a more practical procedure for obtaining the requisite biuret for the process of the present invention would probably be to carefully heat urea at about 140°–150° C. for a short period of time until the necessary biuret had been formed.

*Example 9.*—(Calculated minimum formaldehyde=186 parts.) Urea was heated in an open container at 160°–170° C. for about 15 to 20 minutes. In this time a product was obtained which appeared to contain from 4.8 to 4.9% biuret. 45 parts of p-tertiary amylphenol, 10.7 parts of the above heated urea, 44.3 parts of C. P. urea, 190 parts of 37½% aqueous formaldehyde solution and 200 parts of n-butanol were heated to boiling under a reflux condenser for 30 minutes. 0.4 part of oxalic acid was added and refluxing continued for about 90 minutes. The solution was dehydrated under reduced pressure to form a clear lacquer solution of low viscosity having a solids content of 34.4%.

*Example 10.*—(Calculated minimum formaldehyde=209 parts.) 20 parts of p-tertiary amylphenol, 0.33 part of recrystallized biuret, 39.67 parts of C. P. urea, 200 parts of 37½% formaldehyde solution and 100 parts of n-butanol were heated under a reflux condenser to boiling for 30 minutes. In this time the solution had clouded badly. When the formaldehyde content was increased to 210 parts of 37½% aqueous formaldehyde solution, a clear solution was secured. 0.67 part of oxalic acid was added and refluxing continued for 1 hour. The solution was dehydrated under reduced pressure to form a clear lacquer of medium viscosity.

When amylphenol and many other substituted phenols are employed in the process of the present invention, clear solutions are obtained if the proper proportions of urea, phenolic compound, biuret and formaldehyde are employed. However, if insufficient solvent is present, the solutions which contain water tend to cloud on cooling. This clouding is due only to resin separation and not the formation of insoluble, infusible precipitates as in the case where insufficient formaldehyde is used in making the resin. The clouding due to resin separation may readily be cleared up by the removal of water or the addition of more solvent.

As stated above, the lacquers of the present invention are readily compatible with alkyd resins. It has been found that the lacquer solutions of this invention containing substantial amounts of substituted phenol are also compatible with raw oiticica oil, but not with bodied oiticica or raw or bodied tung, linseed and castor oil and the like.

*Example 11.*—Some of the lacquers described in the foregoing examples were blended with commercial alkyd resins and tested for resistance to hot soap solution, boiling water and sodium hydroxide solution. All alkyd blends contained equal parts by weight of the resins of the present invention and the alkyd. The alkyds employed in these tests are known to the trade as Rezyls. Rezyl 12 is reported to contain 28% of a non-drying oil acid modifier and Rezyl 114, 37% of a drying oil acid and 14% of natural resin. The lacquers and blends of the present invention were compared with a commercial urea lacquer known to the trade as Beetle lacquer #227–8. The following table gives the results of these tests.

| Lacquer and blend | Time in minutes to whiten in 1% soap solution at 60° C. | Time in minutes to whiten in boiling water | Time in hours to fail in NaOH solution |
|---|---|---|---|
| Beetle lacquer | 248 | 75 | ½ in 1% NaOH. |
| Example 9 | 443+ | 75 | 48 in 1% NaOH+144 in 5% NaOH. |
| Example 1 | 289 | 104 | 44 in 5% NaOH. |
| Beetle+Rezyl 12 | 283 | 31 | 47 in 1% NaOH. |
| Example 9+Rezyl 12 | 443+ | 49 | 48 in 1% NaOH+72 in 5% NaOH. |
| Example 1+Rezyl 12 | 83 | 42 | 29 in 5% NaOH. |
| Beetle+Rezyl 114 | 223 | 50 | 48 in 1% NaOH. |
| Example 9+Rezyl 114 | 443+ | 60 | 48 in 1% NaOH+72 in 5% NaOH. |
| Example 1+Rezyl 114 | 83 | 42 | 30 in 5% NaOH. |

In general the resins and lacquers of the present invention exhibit outstanding chemical resistance. This is especially true of the lacquers prepared from the higher substituted phenols. Besides the phenolic compounds employed in the specific examples of the present invention, butylphenol, cyclohexylphenol, diphenylolpropane and the like may be used.

What I claim is:

1. Process of making a clear resinous composition which comprises heating at reaction temperature a mixture containing urea, biuret, a phenol, aqueous formaldehyde solution and a solvent miscible with the reaction mixture for about 10 minutes until partial reaction occurs, adding an acid catalyst and continuing heating until substantially all formaldehyde has reacted and finally distilling off water to produce a substantially anhydrous composition: the weight of urea varying from 1 to 10 times the weight of the phenol as the weight of biuret is varied from 0.1 to about 2.5% of the weight of the urea and the minimum weight of 37½% formaldehyde solution being calculated from the formula:

$$F = \left(9.3 - \frac{254B}{U+B}\right)(U+B+P) - 11.2P$$

where F is weight of said formaldehyde solution, U is weight of urea, B is weight of biuret, and P is weight of the phenol.

2. The process of claim 1 wherein the phenol is amylphenol.

3. A clear resinous composition comprising an anhydrous solution in an organic solvent of the reaction product of a mixture consisting of urea, biuret, a phenol and formaldehyde; said reaction product being obtained from a mixture in which the weight of urea varies from 1 to 10 times the weight of the phenol as the weight of biuret is varied from 0.1 to about 2.5% of the weight of urea and the minimum weight of formaldehyde expressed as 37½% aqueous formaldehyde being calculated from the formula:

$$F = \left(9.3 - \frac{254B}{U+B}\right)(U+B+P) - 11.2P$$

where F is weight of 37½% aqueous formaldehyde solution, U is weight of urea, B is weight of biuret and P is weight of the phenol.

4. The product of claim 3 wherein the phenol is amylphenol.

JOHN B. RUST.